(12) United States Patent
Peng et al.

(10) Patent No.: US 12,107,286 B2
(45) Date of Patent: Oct. 1, 2024

(54) HOUSING ASSEMBLY OF BUTTON CELL, BUTTON CELL AND ELECTRONIC PRODUCT

(71) Applicant: Zhuhai CosMX Battery Co., Ltd., Zhuhai (CN)

(72) Inventors: Ning Peng, Zhuhai (CN); Bin Xie, Zhuhai (CN); Yongwang Wang, Zhuhai (CN)

(73) Assignee: ZHUHAI COSMX BATTERY CO., LTD., Zhuhai (CN)

(*) Notice: Subject to any disclaimer, the term of this patent is extended or adjusted under 35 U.S.C. 154(b) by 185 days.

(21) Appl. No.: 16/930,361

(22) Filed: Jul. 16, 2020

(65) Prior Publication Data
US 2021/0280835 A1 Sep. 9, 2021

(30) Foreign Application Priority Data
Mar. 3, 2020 (CN) .......................... 202010140708.2

(51) Int. Cl.
*H01M 50/216* (2021.01)
*H01M 50/181* (2021.01)
(Continued)

(52) U.S. Cl.
CPC ....... *H01M 50/216* (2021.01); *H01M 50/181* (2021.01); *H01M 50/184* (2021.01);
(Continued)

(58) Field of Classification Search
CPC ............. H01M 50/186; H01M 50/216; H01M 50/538; H01M 50/193; H01M 50/184; H01M 50/109; H01M 50/181; Y02E 60/10
(Continued)

(56) References Cited

U.S. PATENT DOCUMENTS

2006/0115723 A1* 6/2006 Ando .................. H01M 50/183
429/185
2011/0183194 A1* 7/2011 Lee ....................... H01M 50/54
429/179
(Continued)

FOREIGN PATENT DOCUMENTS

CN 2833901 Y 11/2006
CN 101286572 A 10/2008
(Continued)

OTHER PUBLICATIONS

The English language machine translation of "Guan Xiuming, CN106159350(A)-2016-11-23, Button type lithium ion secondary battery and preparation method thereof" (Year: 2016).*
(Continued)

*Primary Examiner* — Jonathan G Jelsma
*Assistant Examiner* — Omar M Kekia
(74) *Attorney, Agent, or Firm* — Dilworth IP, LLC

(57) ABSTRACT

Embodiments of the present invention provide a housing assembly of button cell, a button cell and an electronic product. The housing assembly of button cell includes: a housing and a conductive part, the housing having a holding cavity that is capable of holding a cell of the button cell, the cell having a first tab and a second tab, the housing being provided with a through hole, the conductive part being positioned at and blocking the through hole, and the conductive part and the through hole being sealed and insulated; where, the number of the conductive part is one or two, and when the number of the conductive part is two, the housing is provided with two through holes, where the conductive parts correspond to the through holes one by one. It is beneficial to improving sealability of the housing assembly of button cell.

20 Claims, 10 Drawing Sheets

(51) Int. Cl.
*H01M 50/184* (2021.01)
*H01M 50/186* (2021.01)
*H01M 50/193* (2021.01)
*H01M 50/538* (2021.01)

(52) U.S. Cl.
CPC ....... *H01M 50/186* (2021.01); *H01M 50/193* (2021.01); *H01M 50/538* (2021.01)

(58) Field of Classification Search
USPC .......................................................... 429/100
See application file for complete search history.

(56) References Cited

U.S. PATENT DOCUMENTS

| | | | | |
|---|---|---|---|---|
| 2013/0323607 | A1* | 12/2013 | Issaev | H01M 10/0567 429/338 |
| 2015/0214570 | A1* | 7/2015 | Deponte | H01M 50/411 29/623.5 |
| 2015/0236370 | A1* | 8/2015 | Ensling | H01M 10/0587 429/94 |
| 2015/0295218 | A1* | 10/2015 | Mizuta | H01M 50/543 429/174 |
| 2021/0043913 | A1* | 2/2021 | Zhao | H01M 50/148 |

FOREIGN PATENT DOCUMENTS

| | | |
|---|---|---|
| CN | 202434592 U | 9/2012 |
| CN | 103500844 A | 1/2014 |
| CN | 203553232 U | 4/2014 |
| CN | 104393204 A | 3/2015 |
| CN | 104919617 A | 9/2015 |
| CN | 106159350 A | 11/2016 |
| CN | 106601960 A | 4/2017 |
| CN | 106936190 A | 7/2017 |
| CN | 108428813 A | 8/2018 |
| CN | 109786611 A | 5/2019 |
| CN | 110048137 A | 7/2019 |
| CN | 110459705 A | 11/2019 |
| CN | 209804717 U | 12/2019 |
| CN | 110828885 A | 2/2020 |
| IN | 105990557 A | 10/2016 |
| JP | 2000011981 A | 1/2000 |
| JP | 2002175789 A | 6/2002 |
| JP | 2016103447 A | 6/2016 |
| KR | 20090055088 A | 6/2009 |
| WO | 2017211631 A1 | 12/2017 |
| WO | 2018145361 A1 | 8/2018 |

OTHER PUBLICATIONS

First Office Action in CN Patent Application No. 202010448318.1 dated Mar. 3, 2022.
First Office Action CN Patent Application No. 202010447734.X dated Mar. 31, 2022.
European Search Report from application No. 20185501.2, dated Feb. 17, 2021, 6 pages.
Second Office Action in EP Patent Application No. 20185501.2 dated Apr. 29, 2022.
Third Office Action in CN Patent Application No. 202010448318.1 dated Jun. 30, 2023.
Notice of Allowance in CN Patent Application No. 202010447734.X dated Jul. 25, 2023.
Office Action in CN Patent Application No. CN202010448318.1 dated Sep. 26, 2023.

* cited by examiner

HOUSING ASSEMBLY OF BUTTON CELL, BUTTON CELL AND ELECTRONIC PRODUCT

CROSS-REFERENCE TO RELATED APPLICATION

This application claims priority to Chinese Patent Application No. 202010140708.2, filed on Mar. 3, 2020, which is hereby incorporated by reference in its entirety.

TECHNICAL FIELD

The present disclosure relates to the field of cell technology and, in particular, to a housing assembly of button cell, a button cell and an electronic product.

BACKGROUND

At present, button cells have been widely used in various fields of daily life, such as wearable product field, electronic product field and medical product field.

Since the inside of a button cell is a confined space, sealability is extremely important for the button cell. However, with respect to button cells in the prior art, the sealability is poor, and thus potential safety hazards such as liquid leakage exist, which will bring adverse effects on the quality and performance of button cells.

SUMMARY

The present disclosure provides a housing assembly of button cell, a button cell and an electronic product. Sealability of the housing assembly of button cell is relatively good, which is beneficial to improving quality and performance of the button cell.

In a first aspect, the present disclosure provides a housing assembly of button cell, including a housing and a conductive part, the housing having a holding cavity that is capable of holding a cell of the button cell, the cell having a first tab and a second tab, the housing being provided with a through hole, the conductive part being positioned at and blocking the through hole, and the conductive part and the through hole being sealed and insulated; where the number of the conductive part is one, and the conductive part is configured to electrically connect with one of the first tab and the second tab, and the housing may be electrically connected with the other one of the first tab and the second tab; or the number of the conductive part is two, and the housing is provided with two through holes, where the conductive parts correspond to the through holes one by one, and where one of the two conductive parts is configured to electrically connect with the first tab, and the other one of the two conductive parts is configured to electrically connect with the second tab.

A housing assembly of button cell according to the present disclosure includes a housing and a conductive part, where the housing has a holding cavity that is capable of holding a cell of the button cell, and the cell has a first tab and a second tab. By providing the housing with a through hole and having the conductive part being positioned at and blocking the through hole and, at the same time, having the conductive part and the through holes being sealed and insulated, the housing assembly of button cell can have a relatively good sealability. That is to say, it is only necessary to seal the position between the through hole and the conductive part to form a confined space inside the housing assembly of button cell. Since this sealing method requires fewer sealing setting positions, it will not only make it easy to seal, but also have a relatively small risk of leakage after the sealing setting is completed. Therefore, this sealing method can make the housing assembly of button cell obtain a relatively good sealability, which is beneficial to improving quality and performance of the button cell. Where, the conductive part can be set as one or two, so that the design of the button cell can be more flexible. When the number of the conductive part is one, by electrically connecting the one conductive part with one of the first tab and the second tab, and electrically connecting the housing with the other one of the first tab and the second tab, the cell can output electrical power outward or input electrical power to the cell through the housing and the one conductive part; or, when the number of the conductive part is two, the housing is provided with the two through holes, and the conductive parts correspond to the through holes one by one, by electrically connecting one of the two conductive parts with the first tab, and electrically connecting the other one of the two conductive parts with the second tab, the cell can output electrical power outward or input electrical power to the cell through the two conductive parts.

For the housing assembly of button cell as described above, in an implementation, the housing has two oppositely disposed end surfaces, and at least one of the conductive parts is located on the end surfaces.

In an implementation, the housing has a cylindrical sidewall, which is located between the two oppositely disposed end surfaces, and at least one of the conductive parts is located on the cylindrical sidewall. Further, the outer surface of the cylindrical sidewall has a flat surface extending along a direction of cylindrical generatrix, and at least one of the conductive parts is located on the flat surface.

For the housing assembly of button cell as described above, in an implementation, at least a part of at least one of the end surfaces protrudes in a direction away from the cell to form a convex surface;

at least one of the conductive parts is located on the convex surface.

For the housing assembly of button cell as described above, in an implementation, the conductive part is a conductive nail penetrated through the through hole.

For the housing assembly of button cell as described above, in an implementation, the conductive part is a conductive sheet disposed inside the through hole, and an insulating part is provided between the conductive sheet and the edge of the through hole, and a position of the insulating part corresponding to an outer edge of the conductive sheet is provided with a groove into which the outer edge of the conductive sheet can extend.

For the housing assembly of button cell as described above, in an implementation, hardness of the conductive part is smaller than hardness of the housing.

For the housing assembly of button cell as described above, in an implementation, the housing includes a first housing and a second housing, the first housing and the second housing enclose together to form the holding cavity, and the first housing and the second housing are integral parts.

For the housing assembly of button cell as described above, in an implementation, at least a part of a housing wall of the housing has a thinning area, and thickness of the housing wall in the thinning area is smaller than thickness of other parts of the housing wall.

In a second aspect, the present disclosure provides a button cell, including a cell and the housing assembly of button cell as described in any one of the above items.

A button cell according to the present disclosure includes a cell and a housing assembly of button cell. The housing assembly of button cell includes a housing and a conductive part, where the housing has a holding cavity that is capable of holding a cell of the button cell, and the cell has a first tab and a second tab. By providing the housing with a through hole and having the conductive part being positioned at and blocking the through hole and, at the same time, having the conductive part and the through holes being sealed and insulated, the housing assembly of button cell can have a relatively good sealability. That is to say, it is only necessary to seal the position between the through hole and the conductive part to form a confined space inside the housing assembly of button cell. Since this sealing method requires fewer sealing setting positions, it will not only make it easy to seal, but also have a relatively small risk of leakage after the sealing setting is completed. Therefore, this sealing method can make the housing assembly of button cell obtain a relatively good sealability, which is beneficial to improving quality and performance of the button cell. Where, the conductive part can be set as one or two, so that the design of the button cell can be more flexible. When the number of the conductive part is one, by electrically connecting the one conductive part with one of the first tab and the second tab, and electrically connecting the housing with the other one of the first tab and the second tab, the cell can output electrical power outward or input electrical power to the cell through the housing and the one conductive part; or, when the number of the conductive part is two, the housing is provided with the two through holes, and the conductive parts correspond to the through holes one by one, by electrically connecting one of the two conductive parts with the first tab, and electrically connecting the other one of the two conductive parts with the second tab, the cell can output electrical power outward or input electrical power to the cell through the two conductive parts.

In a third aspect, the present disclosure provides an electronic product, including the button cell as described above.

The electronic product of the present disclosure includes a button cell. The button cell includes a cell and a housing assembly of button cell. The housing assembly of button cell includes a housing and conductive parts, where the housing has a holding cavity that is capable of holding a cell of the button cell, and the cell has a first tab and a second tab. By providing the housing with a through hole and having the conductive part being positioned at and blocking the through hole and, at the same time, having the conductive part and the through holes being sealed and insulated, the housing assembly of button cell can have a relatively good sealability. That is to say, it is only necessary to seal the position between the through hole and the conductive part to form a confined space inside the housing assembly of button cell. Since this sealing method requires fewer sealing setting positions, it will not only make it easy to seal, but also have a relatively small risk of leakage after the sealing setting is completed. Therefore, this sealing method can make the housing assembly of button cell obtain a relatively good sealability, which is beneficial to improving quality and performance of the button cell. Where, the conductive part can be set as one or two, so that the design of the button cell can be more flexible. When the number of the conductive part is one, by electrically connecting the one conductive part with one of the first tab and the second tab, and electrically connecting the housing with the other one of the first tab and the second tab, the cell can output electrical power outward or input electrical power to the cell through the housing and the one conductive part; or, when the number of the conductive part is two, the housing is provided with the two through holes, and the conductive parts correspond to the through holes one by one, by electrically connecting one of the two conductive parts with the first tab, and electrically connecting the other one of the two conductive parts with the second tab, the cell can output electrical power outward or input electrical power to the cell through the two conductive parts.

BRIEF DESCRIPTION OF DRAWINGS

In order to explain embodiments of the present disclosure or the technical solutions in the prior art more clearly, the following will make a brief introduction to the drawings needed in the embodiments or the prior art description. Apparently, the drawings in the following description are merely a part of embodiments of the invention. For persons of ordinary skill in the art, it is also possible to obtain other drawings from these drawings without paying creative labor.

DESCRIPTION OF REFERENCE NUMERALS

1—cell;
11—first tab;
12—second tab;
121—conductive groove;
13—conductive pillar;
14—cavity;
2—housing assembly;
201—upper end surface;
202—lower end surface;
21—housing;
211—first housing;

212—second housing;
2121—thinning area;
2122—boss;
2123—tab groove;
2124—through hole;
2125—injection port;
22a—conductive nail;
22a1—sheet part;
22a2—columnar part;
22a3—flanging;
22a4—fabrication hole;
221—insulating rubber ring;
222—gasket;
22b—conductive sheet;
231—insulating part;
31—first insulating sheet;
32—second insulating sheet.

DESCRIPTION OF EMBODIMENTS

To make the objectives, technical solutions, and advantages of embodiments of the present disclosure clearer, the following clearly and completely describes the technical solutions in embodiments of the present disclosure with reference to the accompanying drawings in embodiments of the present disclosure. Apparently, the described embodiments are merely a part rather than all embodiments of the present disclosure. All other embodiments obtained by persons of ordinary skill in the art based on embodiments of the present disclosure without creative labor belong to the scope of protection of the present disclosure.

With the development of science and technology, more and more electronic products have come into all aspects of people's lives. Button cells have also been widely used in various fields of electronic products, such as a computer mainboard, an electronic watch, an electronic dictionary, an electronic scale, a remote controller, an electric toy, a cardiac pacemaker, an electronic hearing aid, a counter and a camera.

In the prior art, button cells are set insulated and sealed at the butt joint where an upper housings and a lower housings have been butted. Since this sealing method requires more sealing settings, it will not only make it difficult to seal, but also have a relative high risk of leakage after the sealing setting is completed, thereby it will bring adverse effects on quality and performance of the button cell.

In order to solve the above technical problem, the present disclosure provides a housing assembly of button cell. The housing assembly of button cell includes a housing and conductive parts. By opening through holes on the housing and blocking the conductive parts at the through holes, at the same time, the conductive part and the through holes are setting sealed and insulated, thereby the housing assembly of button cell can have a relatively good sealability, which is beneficial to improving quality and performance of the button cell.

The button cell of the present disclosure will be described in detail in the following specific embodiments:

Embodiment I

Figure 1:
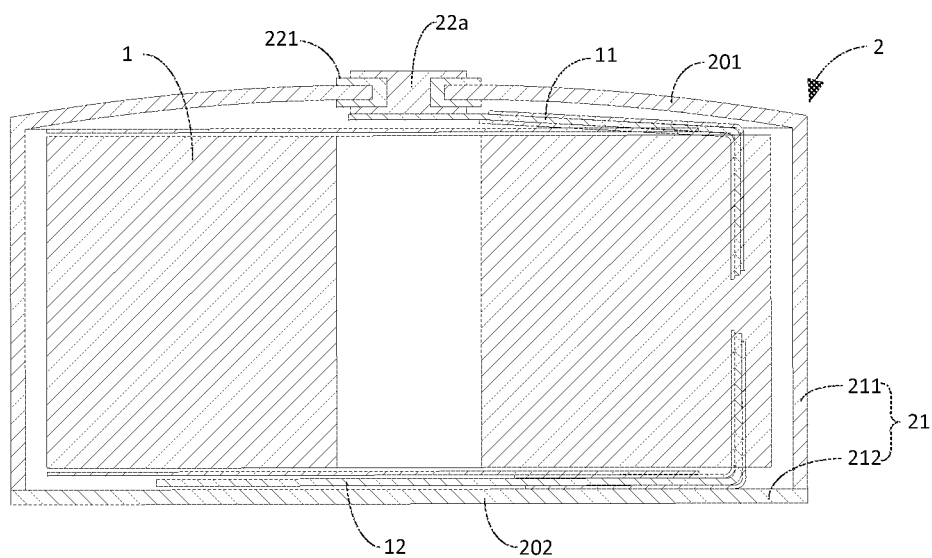
FIG. 1 is Section View I of a button cell provided in Embodiment I of the present disclosure.
Figure 2:
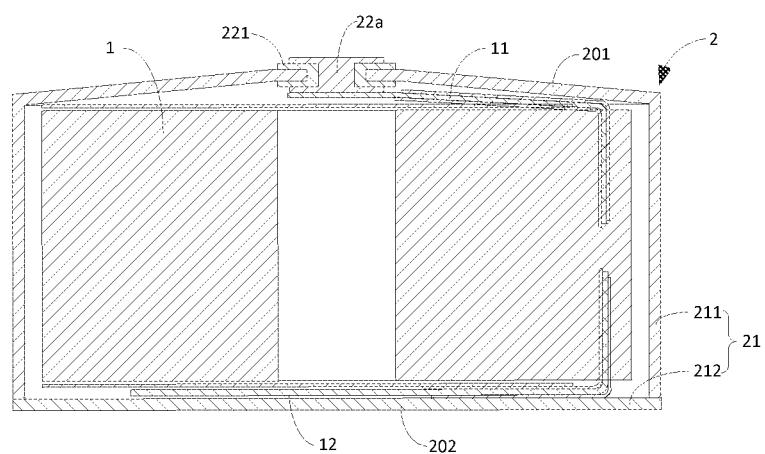
FIG. 2 is Section View II of a button cell provided in Embodiment I of the present disclosure.
Figure 3:
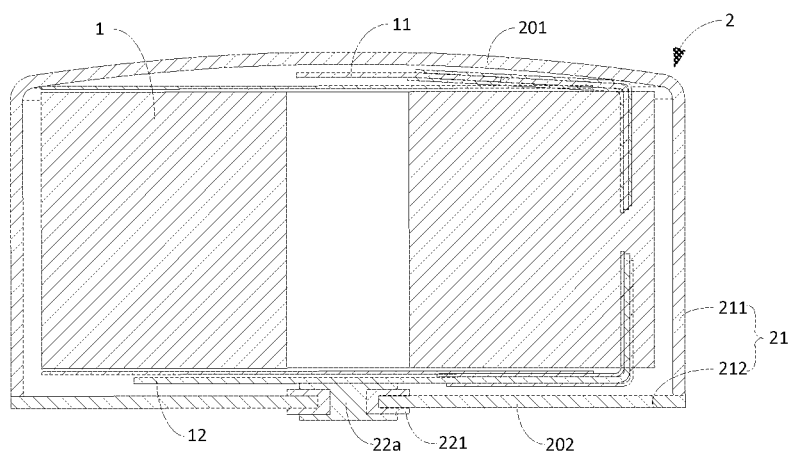
FIG. 3 is Section View III of a button cell provided in Embodiment I of the present disclosure.
Figure 4:
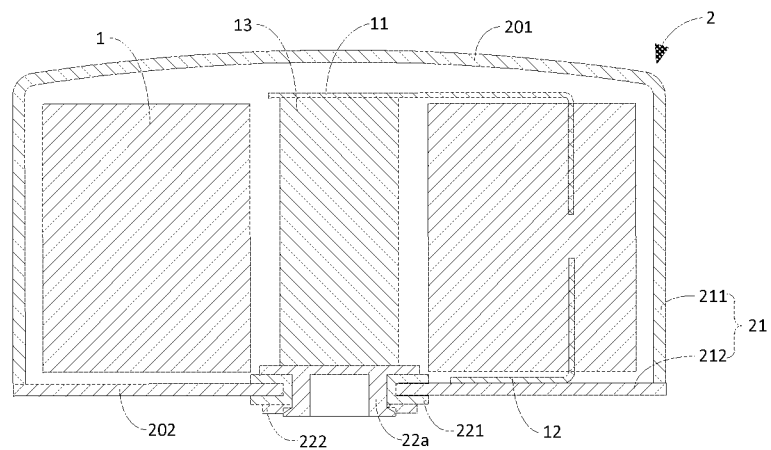
FIG. 4 is Section View IV of a button cell provided in Embodiment I of the present disclosure.
Figure 5:
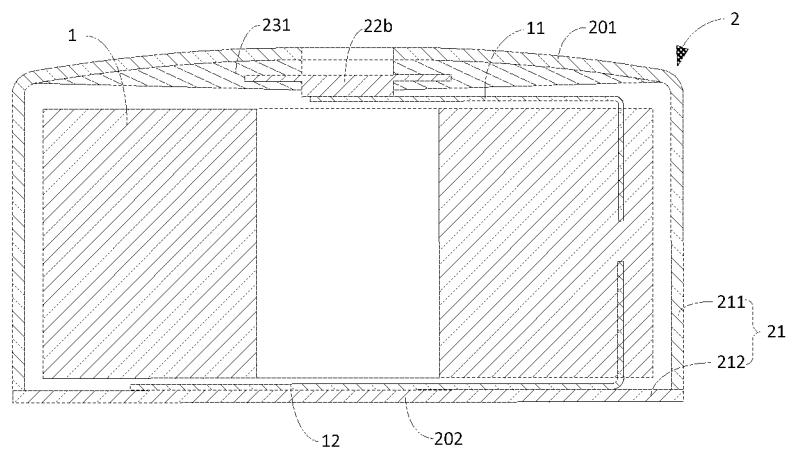
FIG. 5 is Section View V of the button cell provided in Embodiment I of the present disclosure.
Figure 6:
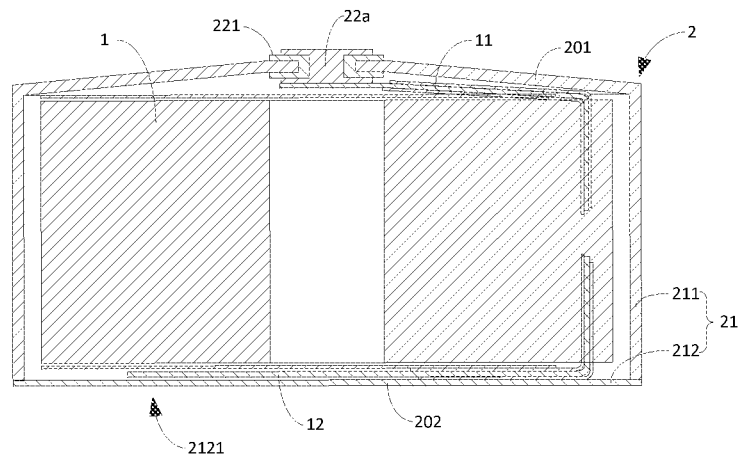
FIG. 6 is Section View VI of a button cell provided in Embodiment I of the present disclosure.
Figure 7:
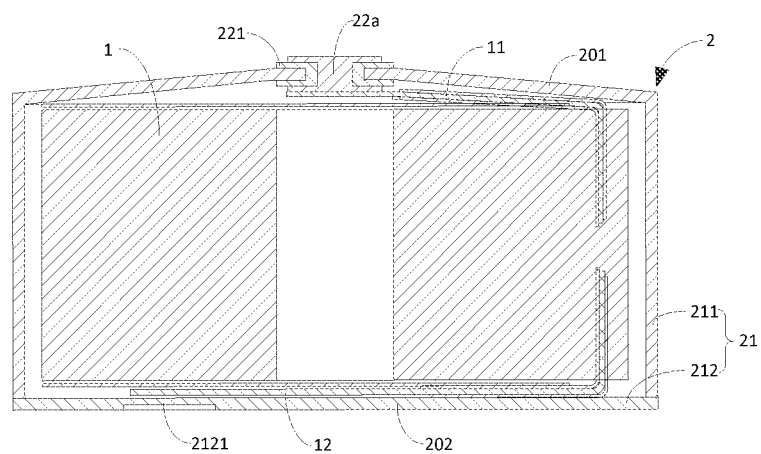
FIG. 7 is Section View VII of a button cell provided in Embodiment I of the present disclosure.

FIG. 1 is Section View I of a button cell provided in Embodiment I of the present disclosure. FIG. 2 is Section View II of a button cell provided in Embodiment I of the present disclosure. FIG. 3 is Section View III of a button cell provided in Embodiment I of the present disclosure. FIG. 4 is Section View IV of a button cell provided in Embodiment I of the present disclosure. FIG. 5 is Section View V of the button cell provided in Embodiment I of the present disclosure. FIG. 6 is Section View VI of a button cell provided in Embodiment I of the present disclosure. FIG. 7 is Section View VII of a button cell provided in Embodiment I of the present disclosure. Referring to FIGS. 1 to 7, the present embodiment provides a housing assembly of button cell.

A housing assembly 2 of button cell includes a housing 21 and conductive parts. The housing 21 has a holding cavity that is capable of holding a cell 1 of the button cell. The cell 1 has a first tab 11 and a second tab 12. The housing 21 is provided with a through hole, and the conductive part is positioned at and blocks the through holes, and the conductive part and the through hole are set sealed and insulated, thereby a confined space can be formed inside the housing assembly 2 of the button cell. The conductive part may be a metal conductive part or a conductive part of other materials.

Where, the conductive part can be set as one or two, so that the design of the button cell can be more flexible.

When the number of the conductive part is one, the housing is provided with only one through hole, and the conductive part is correspondingly positioned at and blocks the through hole. Where, the conductive part may be configured to electrically connect with the first tab and the housing may be electrically connected with the second tab; or the conductive part may be configured to electrically connect with the second tab, and the housing may be electrically connected with the first tab. Therefore, electrical power generated on the cell can be output through the housing and the conductive part to provide electrical power for an external electrical equipment; or when the button cell is a rechargeable button cell and charged by an external charging equipment, the electrical power provided by the charging equipment to the button cell can be transmitted to the cell through the housing and the conductive part.

When the number of the conductive part is two, the housing is provided with two through holes, and one of the conductive parts is correspondingly positioned at and blocks one of the through holes. One of the two conductive parts may be configured to electrically connect with the first tab, and the other one of the two conductive parts may be configured to electrically connect with the second tab. Therefore, the electrical power generated on the cell can be output through the two conductive parts to provide electrical power for an external electrical equipment; or when the button cell is a rechargeable button cell and charged by an external charging equipment, the electrical power provided by the charging equipment to the button cell can be transmitted to the cell through the two conductive parts.

It can be understood that one of the first tab 11 and the second tab 12 is a positive electrode of the cell 1, and the other of the first tab 11 and the second tab 12 is a negative electrode of the cell 1. For example, when the number of the conductive part is one, the conductive part is connected with a tab that serves as the positive electrode, and the housing 21 is connected to a tab that serves as the negative electrode. When the button cell with the housing assembly 2 is applied to an electronic product, the conductive part is electrically connected to the positive electrode of the electronic product, and the housing 21 is electrically connected to the negative electrode of the electronic product, thereby supplying power to the electronic product. For another example, when the number of the conductive part is two, one of the two conductive parts is connected with the tab that serves as the positive electrode, and the other of the two conductive parts is connected with the tab that serves as the negative electrode. When the button cell with the housing assembly 2 is applied to an electronic product, the conductive part connected with the positive tab is electrically connected to the positive electrode of the electronic product, and the conductive part connected with the negative tab is electrically connected to the negative electrode of the electronic product, thereby supplying power to the electronic product.

The housing assembly 2 of the button cell of the present embodiment includes the housing 21 and a conductive part. The housing 21 has a holding cavity that is capable of holding a cell 1 of the button cell, and the cell 1 has the first tab 11 and the second tab 12. By providing the housing 21 with a through hole and having the conductive part being positioned at and blocking the through hole and, at the same time, having the conductive part and the through holes being sealed and insulated, the housing assembly of button cell can have a relatively good sealability. That is to say, it is only necessary to seal the position between the through hole and the conductive part to form a confined space inside the housing assembly of button cell. Since this sealing method requires fewer sealing setting positions, it will not only make it easy to seal, but also have a relatively small risk of leakage after the sealing setting is completed. Therefore, this sealing method can make the housing assembly of button cell obtain a relatively good sealability, which is beneficial to improving quality and performance of the button cell. Where, the conductive part can be set as one or two, so that the design of the button cell can be more flexible. When the number of the conductive part is one, by electrically connecting the one conductive part with one of the first tab and the second tab, and electrically connecting the housing with the other one of the first tab and the second tab, the cell can output electrical power outward or input electrical power to the cell through the housing and the one conductive part; or, when the number of the conductive part is two, the housing is provided with the two through holes, and the conductive parts correspond to the through holes one by one, by electrically connecting one of the two conductive parts with the first tab, and electrically connecting the other one of the two conductive parts with the second tab, the cell can output electrical power outward or input electrical power to the cell through the two conductive parts.

The housing of the present embodiment may have two oppositely disposed end surfaces, and a specific implementation that at least one conductive part is located on the end surfaces includes:

when the number of the conductive part is one, the one conductive part may be located on any one of the two end surfaces of the housing;

when the number of the conductive part is two, the first possible implementation is that one of the two conductive parts may be located on any one of the two end surfaces of the housing, and the other conductive part may be set at anywhere other than the two end surfaces of the housing; the second possible implementation is that each end surface of the housing is provided with a conductive part; the third possible implementation is that the two conductive parts are simultaneously disposed on one of the two end surfaces of the housing.

Furthermore, in the two end surfaces of the housing, at least a part of at least one of the end surfaces protrudes toward a direction away from the cell to form a convex surface, thereby the holding cavity of the housing can be enlarged. By providing at least one conductive part on the convex surface, thereby, a part of the conductive part located inside the through hole occupies the space defined by the convex surface, and then it can reduce or avoid the part of the conductive part located inside the through hole from occupying the columnar space where the cell is located. Where, the space defined by the convex surface is the space swept by the end surface or a part of the end surface protruding from a flat surface state to form a convex surface.

In specific implementation, when the number of the conductive part is one, the conductive part is located on the convex surface; when the number of the conductive part is two, one of the two conductive parts may be located on the convex surface, and the other conductive part is provided anywhere other than the convex surface according to actual needs, or the two conductive parts are located on the convex surface, thereby it can reduce or avoid a part of the conductive part located inside the through hole from occupying the columnar space where the cell is located, and then on the basis of improving the sealability of the housing assembly of button cell, it is beneficial to ensuring the performance of the button cell is not affected.

In addition, at least a part of the first tab and/or at least a part of the second tab may also be provided in the space defined by the convex surface, thereby the first tab and/or the second tab do not need to occupy or occupy less the columnar space where the cell is located, and then it is beneficial to improve the performance of the button cell. Moreover, a provision of the convex surface increases volumes of the holding cavity of the housing, thereby it is beneficial to increasing the amount of electrolyte injected into the holding cavity, and then improving the cycle performance of the button cell.

With reference to FIG. 1 to FIG. 7, there are multiple implementations of the present embodiment that at least a part of at least one end surface protrudes toward a direction away from the cell to form a convex surface. For convenience of description, one of the two oppositely disposed sides of the housing 21 may be called an upper end surface 201, and the other may be called a lower end surface 202.

The housing 21 of the present embodiment has an upper end surface 201 and a lower end surface 202 which are oppositely disposed. Where, the upper end surface 201 may include two states: the first state is that the entire upper end surface 201 protrudes toward a direction away from the cell 1 to form a convex surface; the second state is that a part of the upper end surface 201 protrudes toward a direction away from the cell 1 to form a convex surface. The lower end surface 202 may include three states: the first state is that the entire lower end surface 202 protrudes toward a direction away from the cell 1 to form a convex surface; the second state is that a part of the lower end surface 202 protrudes toward a direction away from the cell 1 to form a convex surface; the third state is that the lower end surface 202 maintains a flat state. In the present embodiment, the upper end surface 201 of the housing 21 may be in any one of the two states, and the lower end surface 202 may be in any one of the three states, which can make the holding cavity of the housing 21 increase volumes of the space defined by the convex surface on the basis of an original volume.

It should be noted that, each of the two oppositely disposed end surfaces may be called an upper end surface, and the other is a lower end surface.

In an implementation, the convex surface can be set as a spherical surface or a conical surface. On one hand, it is convenient for processing and molding; on the other hand, it is may make the shape of the button cell simple and elegant. In other embodiments, the convex surface may be separately provided according to actual needs. For example, it may be formed as a convex surface by splicing multiple flat surfaces. For another example, it may be formed as a convex surface by splicing together curved surfaces and flat surfaces.

An implementation of the housing assembly 2 of the present embodiment is that the entire upper end surface 201 protrudes toward a direction away from the cell 1 to form a convex surface, the lower end surface 202 is a flat surface, and the number of the conductive part is one, and the conductive part is provided on the convex surface. Therefore, it can not only improve the sealability of the housing assembly of button cell, but also reduce or avoid the part of the conductive part located inside the through hole from occupying the columnar space where the cell is located, and then it is beneficial to improving the quality and performance of the button cell.

In other embodiments, an implementation of the housing assembly 2 of the button cell may also be that the entire upper end surface 201 protrudes toward a direction away from the cell 1 to form a convex surface, and the lower end surface 202 is a flat surface, and the number of the conductive part is one, and the conductive part may be set on the flat surface according to actual needs. At this time, the space defined by the convex surface can be used to set the tabs, and can be used to set other components located in the holding cavity of the housing, and can also be used to increase the amount of electrolyte injected. Therefore, it can improve the sealability of the housing assembly of button cell, and it is beneficial to improving the performance of the button cell.

The conductive part in the present embodiment may be a conductive nail 22a penetrated in the through hole. The conductive nail 22a is provided with a sheet part or a flanging at both ends outside the through hole, thereby it is convenient for fixing the conductive nail 22a at the through hole. The following describes specific implementations of the conductive nail 22a set on the convex surface and the flat surface respectively.

In a first aspect, an end surface where a conductive nail 22a is located is a convex surface. The following describes in detail only by taking the convex surface as a spherical surface and a conical surface as an example. It can be understood that the convex surface may be other shapes than the spherical surface and the conical surface. When the convex surface is other shapes, specific arrangement methods of the conductive nail 22a can reference to arrangement methods on the spherical surface and the conical surface.

As shown in FIG. 1, the upper end surface 201 of the housing 21 protrudes in a direction away from the cell 1 to form a spherical surface, and the lower end surface 202 may be provided as a convex surface or a flat surface according to actual needs, and a flat surface is taken as an example here. The spherical surface is provided with a through hole. In an implementation, the through hole may be provided at the farthest end of the spherical surface protruding in a direction away from the cell 1, thereby an inside of the spherical surface has sufficient space for the conductive nail 22a, and then a part of the conductive nail 22a located inside the spherical surface will not interfere with the cell 1. In order to provide sealing and insulating between the conductive nail 22a and the through hole, an insulating part, such as an insulating rubber ring 221, may be provided between the conductive nail 22a and the through hole. The insulating rubber ring 221 can not only insulate the conductive nail 22a from the housing 21, but also have an effect of sealing a gap between the conductive nail 22a and the housing 21. The first tab 11 may be directly connected with a part of the conductive nail 22a extended into the through hole, so that at least a part of the first tab 11 is located in the space defined by the spherical surface, thereby it will not to occupy the columnar space where the cell 1 is located. The second tab 12 may be directly connected with the other end surface of the housing 21, and the second tab 12 may also be electrically connected to any position of the housing 21 according to actual needs.

As shown in FIG. 2, the upper end surface 201 of the housing 21 protrudes in a direction away from the cell 1 to form a conical surface, and the lower end surface 202 may be provided with a convex surface or a flat surface according to actual needs, and a flat surface is taken as an example here. The conical surface is provided with a through hole. In an implementation, the through hole may be opened at the farthest end of the conical surface protruding in a direction away from the cell 1, i.e., the top of the tapered surface, thereby the inside of the tapered surface has sufficient space for the conductive nail 22a, and then the part of the conductive nail 22a located inside the tapered surface will not interfere with the cell 1. Other arrangement method in FIG. 2 can reference to the above description of FIG. 1, which will not be repeated here.

In a second aspect, an end surface where a conductive nail 22a is located is a flat surface.

As shown in FIG. 3, the upper end surface 201 of the housing 21 protrudes in a direction away from the cell 1 to form a convex surface, and a spherical surface is taken as an example here. The lower end surface 202 is a flat surface, and a through hole is opened on the flat surface. Generally, the through hole is opened in the middle of the flat surface, and a part of the conductive nail 22a extended into the through hole can be set thinner to reduce the space occupied by the conductive nail 22a. In order to provide sealing and insulating between the conductive nail 22a and the through hole, an insulating part, such as the insulating rubber ring 221, may be provided between the conductive nail 22a and the through hole. The insulating rubber ring 221 can not only insulate the conductive nail 22a and the housing 21, but also have an effect of sealing a gap between the conductive nail 22a and the housing 21. The second tab 12 may be directly connected with a part of the conductive nail 22a extended into the through hole. The first tab 11 may be extended into a space defined by the spherical surface and directly connected with the spherical surface. The space defined by the spherical surface may also be used to contain electrolyte to improve performance of the button cell.

When the conductive nail 22a is provided on the flat surface of the housing 21, the first tab 11 and the second tab 12 may have another connection method, as shown in FIG. 4, the holding cavity of the housing is further provided with a conductive pillar 13. The first tab 11 may be electrically connected with the conductive nail 22a through the conductive pillar 13 and the second tab 12 may be directly connected with the flat surface of the housing 21. The side of the conductive nail 22a away from the cell 1 is provided with a fabrication hole, thereby it is not only convenient for arranging the conductive nail on the housing, but also convenient for connecting external devices. In addition, in order to make the sealability between the conductive nail 22a and the housing 21 better, an insulating part provided between the conductive nail 22a and the through hole may be an insulating rubber ring 221. In order to be able to tightly compress the insulating rubber ring 221 between the conductive nail 22a and the through hole, a gasket 222 can also be provided on a part of the conductive nail 22a located outside the through hole, so that it makes the conductive nail 22a, the insulating rubber ring 221 and the through hole tighter and the sealability better.

The conductive part in the present embodiment may also be a conductive sheet 22*b* provided inside the through hole. An insulating part 231 is provided between the conductive sheet 22*b* and the edge of the through hole. The position of the insulating part 231 corresponding to the outer edge of the conductive sheet 22*b* is provided with a groove into which the outer edge of the conductive sheet 22*b* can be extend. The conductive sheet 22*b* may be provided on a convex surface or a flat surface. In an implementation, the conductive sheet 22*b* is provided in a space defined by the convex surface. The following describes in detail by taking the convex surface as a spherical surface as an example. It can be understood that the convex surface may be other shapes than the spherical surface. When the convex surface is other shapes, the specific arrangement methods of the conductive sheet 22*b* can refer to the arrangement method on the spherical surface.

As shown in FIG. 5, the upper end surface 201 of the housing 21 protrudes in a direction away from the cell 1 to form the spherical surface, and the lower end surface 202 may be provided with a convex surface or a flat surface according to actual needs, and a flat surface is taken as an example here. The spherical surface is provided with a through hole. In an implementation, the through hole may be provided at the farthest end of the spherical surface protruding in a direction away from the cell 1, thereby an inside of the spherical surface has sufficient space for the conductive sheet 22*b*, and then the conductive sheet 22*b* will not interfere with the cell 1. Meanwhile, the insulating part 231 disposed between the conductive sheet 22*b* and the edge of the through hole may be an insulating rubber ring or an insulating part of other materials. The first tab 11 can extend into a space defined by the spherical surface and be electrically connected with the conductive sheet 22*b*, so that the first tab 11 does not occupy or occupies less columnar space where the cell 1 is located. The second tab 12 can be electrically connected with any position of the housing 21.

In other embodiments, when the number of the conductive part is two, the two conductive parts may be both conductive nails 22*a* penetrated in the through holes, or may be both conductive sheets 22*b* arranged inside the through holes, or may be one conductive nail 22*a* and one conductive sheets 22*b*. The specific arrangement of the two conductive parts can be adjusted adaptively with reference to the above arrangement methods of the conductive nail 22*a* and the conductive sheet 22*b*, which will not be repeated here.

The housing of the present embodiment includes a first housing 211 and a second housing 212, where the first housing 211 and the second housing 212 enclose together to form the holding cavity, and the first housing 211 and the second housing 212 are integral parts. The first housing 211 may be a semi-enclosed structure with an opening at one end, or may be designed as a convex structure or a planar structure according to actual needs; the second housing 212 may be a planar structure or a convex structure, or may be designed as a structure with a bent part at the edge according to actual needs. The first housing 211 and the second housing 212 are integral parts, which means that the first housing 211 and the second housing 212 cannot be split. That is, the first housing 211 and the second housing 212 may be processed and molded at the same time into an inseparable whole, or after being processed separately, the first housing 211 and the second housing 212 may be joined by welding or other processes into an inseparable whole. Therefore, it can make the sealing effect of the housing assembly 2 of the button cell better, and reduce the risk of liquid leakage, and then it is beneficial to improving the quality and performance of the button cell.

In other embodiments, the first housing 211 and the second housing 212 can also be set into a separable structure according to actual needs, which will not be repeated here.

Since the inside of the housing assembly of button cell is a confined space, and gas will be generated and accumulated in the housing assembly of button cell due to some abnormal conditions during use of the button cell, which leads to an increase of internal pressure of the housing assembly of button cell, thereby bringing a risk of explosion. Therefore, in order to avoid a serious explosion accident caused by excessive internal pressure of the housing assembly of button cell, the following three possible implementations can be used.

The first possible implementation is to set hardness of a conductive part to be smaller than hardness of a housing. For example, the conductive part can be made of aluminum alloy. Therefore, in a process of gradually increasing the internal pressure of the housing assembly of button cell, the conductive part positioned at and blocking the through hole of the housing is first rushed to release the pressure, and thus prevent the internal pressure of the housing assembly of button cell from further increasing and eventually causing a serious explosion accident.

The second possible implementation is to set thickness of the part of the conductive part located inside the through hole to be smaller than thickness of a housing wall. Therefore, on one hand, it is convenient for the housing assembly of button cell to rush the conductive part to release pressure during the increase of the internal pressure to prevent further explosion; on the other hand, it saves a space inside the housing assembly of button cell.

The third possible implementation is to set at least a part of the housing wall of the housing 21 with a thinning area 2121, and thickness of the housing wall in the thinning area 2121 is smaller than thickness of other parts of the housing wall. The housing 21 includes the first housing 211 and the second housing 212. In an implementation, the thinning area 2121 may be an entire second housing 212 or a part of the second housing 212. As shown in FIG. 6, thickness of the entire second housing 212 is smaller than thickness of the first housing 211, that is, the entire second housing 212 is a thinning area 2121. As shown in FIG. 7, the part of the second housing 212 is set with the thinning area 2121, and the thickness of the thinning area 2121 is smaller than the thickness of other parts of the second housing 212. A shape of the thinning area 2121 may be any shape such as a circle, a square, or a cross. In other embodiments, the thinning area 2121 may also be an entire first housing 211 or a part of the first housing 211, which will not be repeated here.

In specific implementation, in the process of gradually increasing the internal pressure of the housing assembly of button cell, the thinning area will first be unable to withstand the increasing pressure and be rushed to release the internal pressure of the housing assembly of button cell. Therefore, it can prevent the internal pressure of the housing assembly of button cell from further increasing and eventually causing a serious explosion accident.

It should be noted that the above three implementations to prevent a serious explosion accident caused by excessive internal pressure of the housing assembly of button cell can be used either alone or in combination according to actual needs.

The specific implementation of welding in the present embodiment may be laser welding, resistance welding, or ultrasonic welding according to the actual situation, and no specific limitation is made here.

Embodiment II

Figure 8:
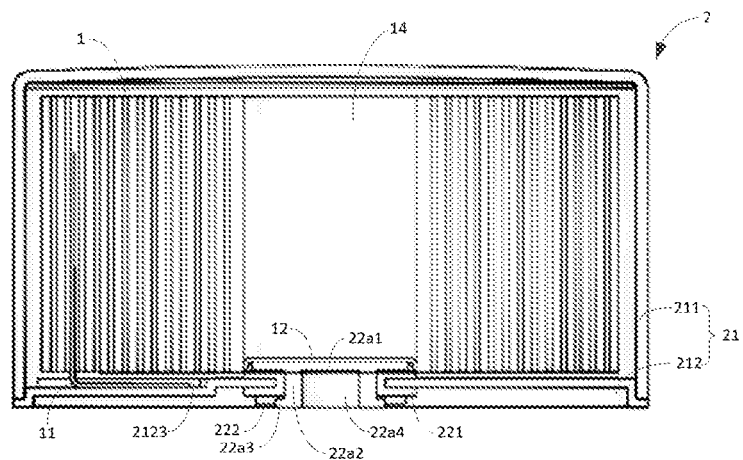
FIG. 8 is Section View I of a button cell provided in Embodiment II of the present disclosure.
Figure 9:
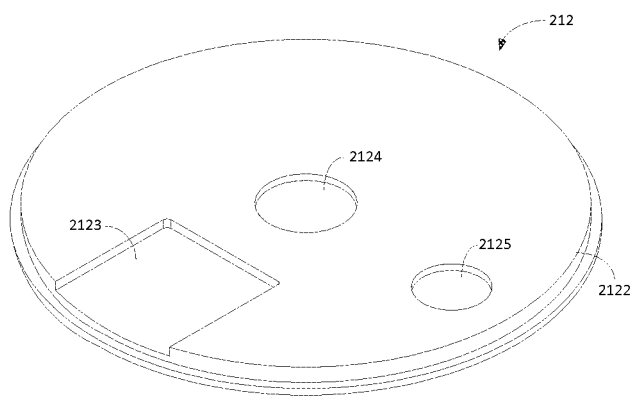
FIG. 9 is a schematic structural view of a bottom cover of the button cell in FIG. 8.
Figure 10:
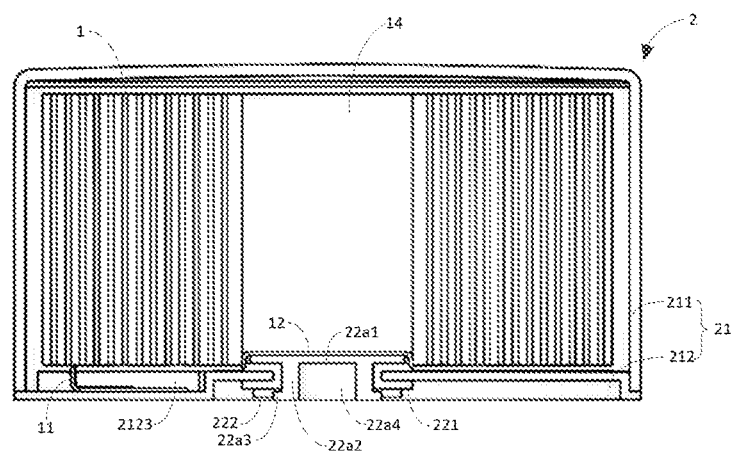
FIG. 10 is Section View II of a button cell provided in Embodiment II of the present disclosure.
Figure 11:
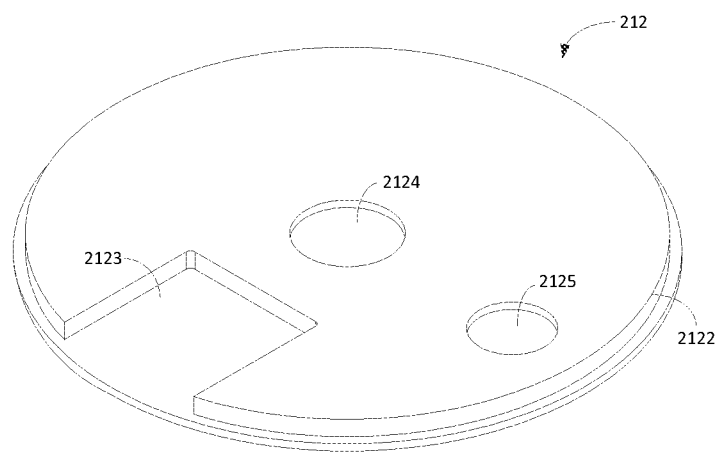
FIG. 11 is a schematic structural view of a bottom cover of the button cell in FIG. 10.
Figure 12:
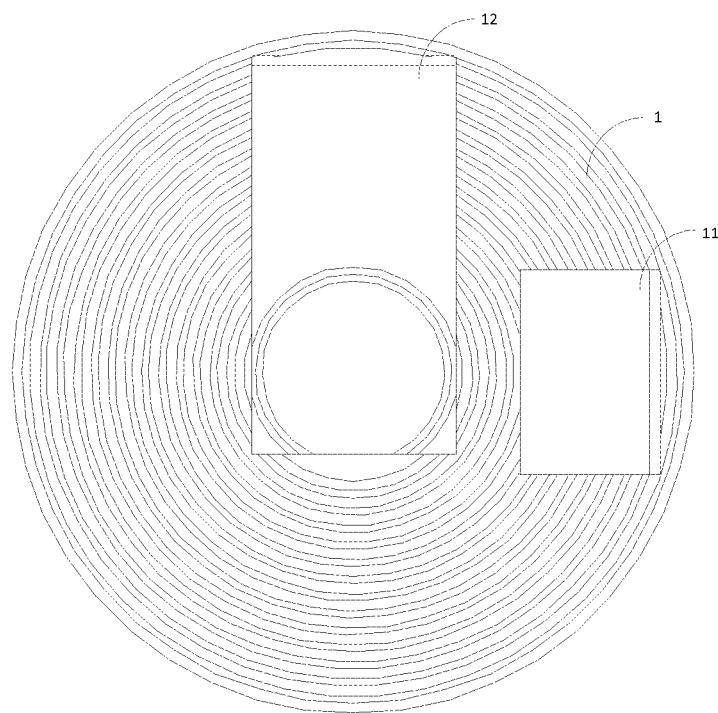
FIG. 12 is a bottom view of the button cell provided in Embodiment II of the present disclosure after removing a second housing.

FIG. 8 is Section View I of a button cell provided in Embodiment II of the present disclosure FIG. 9 is a schematic structural view of a bottom cover of the button cell in FIG. 8. FIG. 10 is Section View II of a button cell provided in Embodiment II of the present disclosure. FIG. 11 is a schematic structural view of a bottom cover of the button cell in FIG. 10. FIG. 12 is a bottom view of the button cell provided in Embodiment II of the present disclosure after removing a second housing. FIG. 13 to FIG. 17 are schematic diagrams of an assembly process of the button cell provided in Embodiment II of the invention. FIG. 18 is an exploded view of a button cell provided in Embodiment II of the present disclosure. As shown in FIG. 8-18, the present embodiment provides a housing assembly of button cell.

The housing assembly 2 of the button cell in the present embodiment is the same as that in Embodiment I, including a housing 21 and conductive parts.

The housing 21 of the present embodiment includes a first housing 211 having an opening at one end and a second housing 212 covered at the opening of the first housing 211. The second housing 212 may also be called a bottom cover.

Specifically, a side of the second housing 212 facing the first housing 211 is provided with a boss 2122 matching the opening of the first housing 211. The boss 2122 may be formed by the second housing 212 protruding toward the first housing 211, or may be a boss structure added on a side of the second housing 212 facing the first housing 211. When the second housing 212 is covered at the opening of the first housing 211, the boss 2122 on the second housing 212 extends into the first housing 211. Therefore, it is not only convenient for welding the first housing 211 and the second housing 212 together to make the joint between the first housing 211 and the second housing 212 more reliable, but also further improves sealability of the housing.

The conductive part in the present embodiment is a conductive nail 22a provided on the second housing 212. In an implementation, the conductive nail 22a is located at the center of the second housing 212, that is, the center of the second housing 212 is provided with a through hole 2124, and the conductive nail 22a is penetrated through the through hole 2124, and at the same time, an insulating part is provided between the conductive nail 22a and the through hole 2124. Specifically, the conductive nail 22a includes a columnar part 22a2 and a sheet part 22a1 extending from the side of the second housing 212 which have the boss 2122. Thickness of the sheet part 22a1 can be set according to actual needs. For example, the thickness of the sheet part 22a1 can be set between 0.1 mm and 0.25 mm and, in an implementation, between 0.12 mm and 0.2 mm. One end of the columnar part 22a2 may be connected with the sheet part 22a1 by welding, and the other end of the columnar part 22a2 is provided with a flanging 22a3 extending toward the periphery of the through hole 2124. A width of the flanging 22a3 can be set according to actual needs. For example, the width of the flanging 22a3 can be set between 0.3 mm and 2.5 mm and thus, on the one hand, the conductive nail 22a can be fixed on the second housing 212, and on the other hand, it is convenient for tightly compressing the insulating part provided between the conductive nail 22a and the through hole 2124. In addition, the sheet part 22a1 and the columnar part 22a2 may be separately processed and connected by welding or the like, or may be integrally formed.

The insulating part may be an insulating rubber ring 221, and the insulating rubber ring 221 may be made of fluorine rubber or EPDM rubber, or may be made of other materials. In order to reliably and tightly compress the insulating rubber ring 221 between the conductive nail 22a and the through hole 2124, a gasket 222 can also be provided between the flanging 22a3 of the conductive nail 22a and the insulating rubber ring 221. The gasket 222 may be a stainless-steel gasket or a nickel alloy gasket, or may be a gasket of other materials. In addition, for convenience of welding the sheet part 22a1 of the conductive nail and a second tab 12 together, a fabrication hole 22a4 for welding may be opened in the columnar part 22a2 of the conductive nail. In a specific implementation, a welding gun can extend from the fabrication hole 22a4 into the inside of the conductive nail 22a to weld the sheet part 22a1 of the conductive nail and the second tab 12 together.

The boss 2122 of the second housing of the present embodiment may be provided with a tab groove 2123 for receiving a tab, and the shape of the tab groove 2123 may match the shape of the tab provided therein. Therefore, on the one hand, the tabs provided therein can be positioned, and on the other hand, the tabs provided therein do not occupy or occupy less space where a cell is located. The tab groove 2123 may be formed by depressing the surface of the boss 2122 toward a direction away from a first housing 211, or by removing a part of material on the surface of the boss 2122. In an implementation, as shown in FIG. 8 and FIG. 9, a flat surface of a groove bottom of the tab groove 2123 is located between an upper surface of the boss 2122 and a flat surface of a lower edge of the boss 2122. Therefore, on the one hand, it is capable of holding and positioning the tabs to save an internal space of the button cell; on the other hand, it is convenient for welding the first housing 211 and the second housing 212 to improve reliability and sealability of a joint between the first housing 211 and the second housing 212.

In other embodiments, as shown in FIG. 10 and FIG. 11, the flat surface of the groove bottom of the tab groove 2123 can also be flush with the plane of the lower edge of the boss 2122, thereby it may make a holding space inside the tab groove 2123 larger. It can not only avoid the tab from occupying the space where the cell is located, but also may increase a capacity of the button cell to accommodate electrolyte, and then is beneficial to improving performance of the button cell.

The housing 21 of the present embodiment is also provided with an injection port 2125. The injection port 2125 is configured to inject electrolyte into the button cell. The injection port 2125 may be provided on the first housing 211 according to actual needs, or may be provided on the second housing 212 (as shown in FIGS. 8 to 18), no specific limitation is made here.

Figure 13:
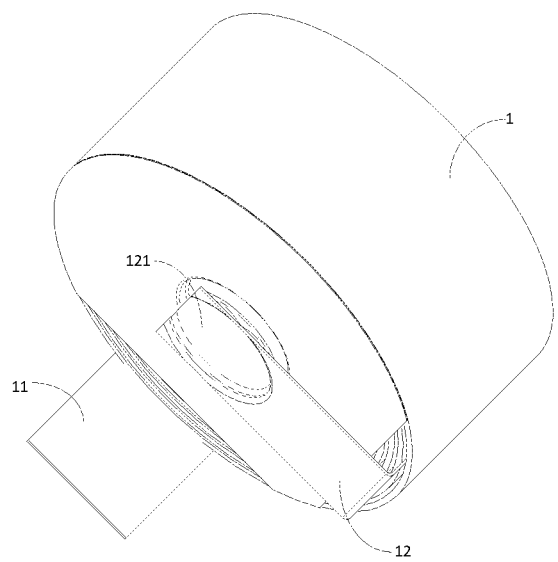
FIG. 13 to FIG. 17 are schematic diagrams of an assembly process of a button cell provided in Embodiment II of the invention.

Applying the housing assembly of button cell of the present embodiment to the button cell. As shown in FIG. 8, FIG. 10 and FIG. 13, the first tab 11 may be connected with the tab groove 2123 of the second housing 212, and the second tab 12 is connected with the sheet part 22a1 of the conductive nail. Specifically, a position where the second tab 12 is connected with the sheet part 22a1 may be depressed in a direction away from the sheet part 22a1 to form a conductive groove 121 matching the shape of the sheet part 22a1. For example, when the sheet part 22a1 is circular, the position where the second tab 12 is connected with the sheet part 22a1 may be depressed to form a circular conductive groove 121. Therefore, the second tab 12 can be snap-fitted on the sheet part 22a1 to achieve a positioning connection with the second tab 12. Furthermore, as shown in FIG. 12, in order to prevent a short-circuit between the first tab 11 and the second tab 12, the included angle between an orthographic projection of the first tab 11 on the second housing 212 and an orthographic projection of the second tab 12 on the second housing 212 can be set between 20° and 160°. In addition, as shown in FIG. 8 and FIG. 10, in order to make the sheet part 22a1 of the conductive nail not occupy or occupy less thickness of a space where a cell 1 is located, a cross-sectional shape of a cavity 14 in the middle of the cell can be provided to match a cross-sectional shape of the sheet part 22a1 of the conductive nail, so that when the conductive nail 22a is assembled, the sheet part 22a1 of the conductive nail can extend into the cavity 14 in the middle of the cell. For example, the cross section of the sheet part 22a1 of the conductive nail may be circular, and the cross section of the cavity 14 in the middle of the cell may be circular too, and the diameter of the circular cross section of the cavity 14 in the middle of the cell is larger than the diameter of the circular cross section of the sheet part 22a1 of the conductive nail, so that the sheet part 22a1 of the conductive nail can be smoothly extended into the cavity 14 in the middle of the cell. It can be understood that, a part of the conductive groove 121 where the second tab 12 is snap-fitted on the sheet part 22a1 of the conductive nail may also extend into the cavity 14 in the middle of the cell along with the sheet part 22a1. In addition, an insulating part between the sheet part 22a1 of the conductive nail and the second housing 212, such as the insulating rubber ring 221, may also partially or fully extend into the cavity 14 in the middle of the cell. Therefore, the sheet part 22a1 of the conductive nail and the insulating part provided between the sheet part 22a1 of the conductive nail and the second housing 212 do not occupy or less occupy the thickness of the space where the cell is located.

Figure 14:
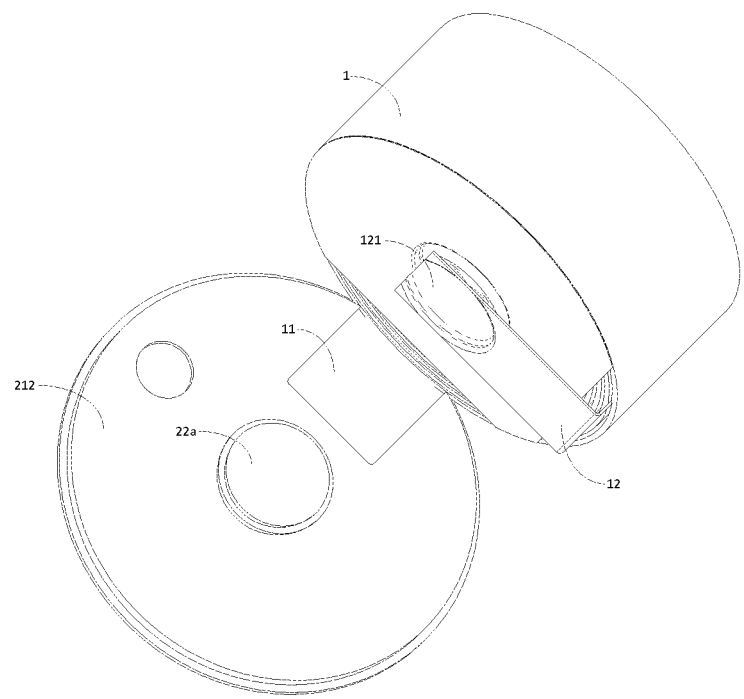
Figure 15:
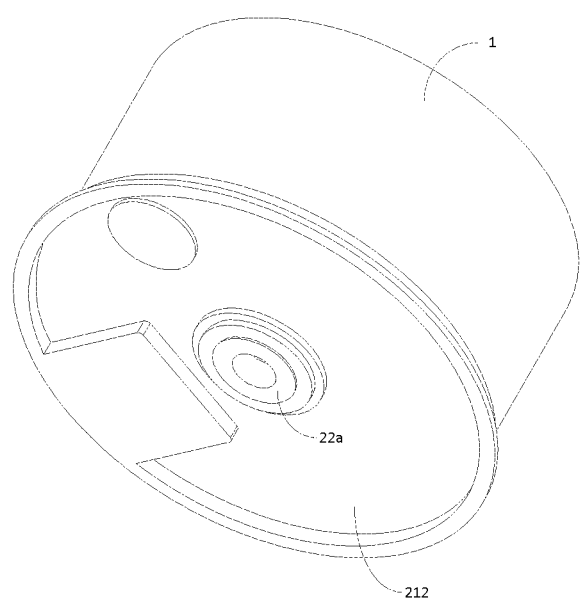
Figure 16:
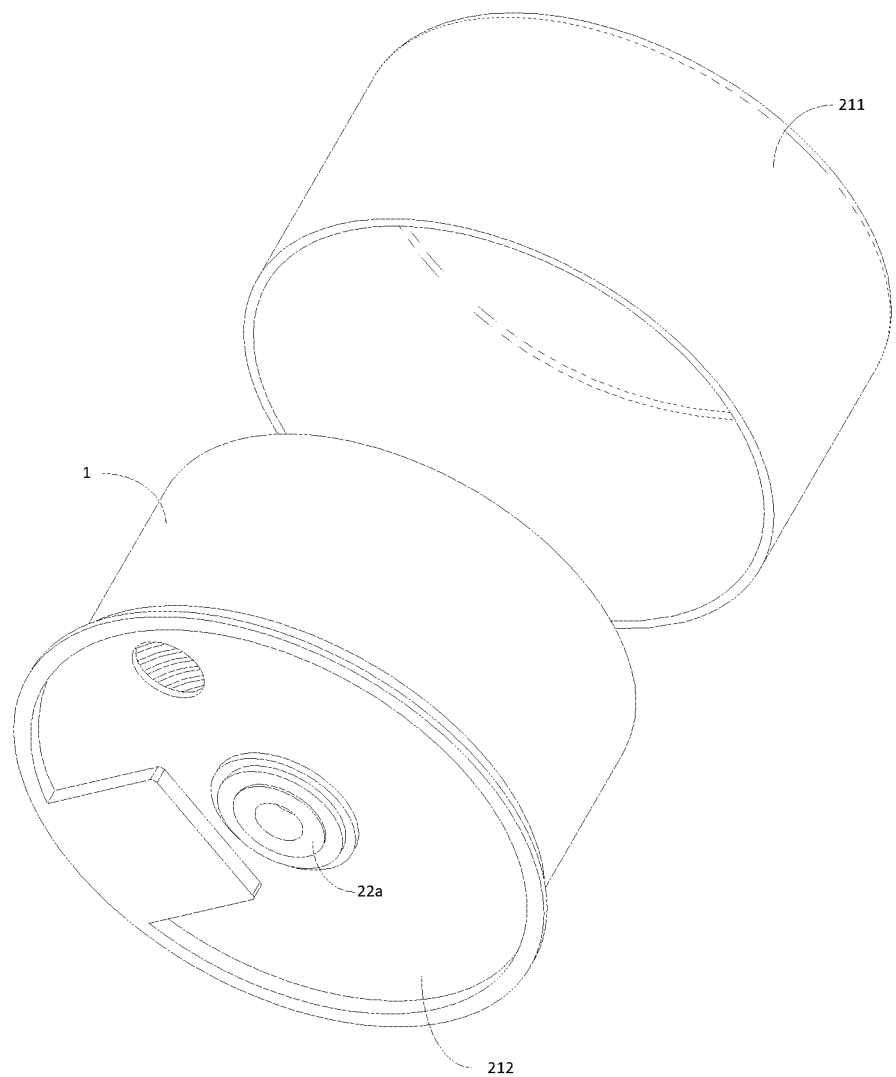
Figure 17:
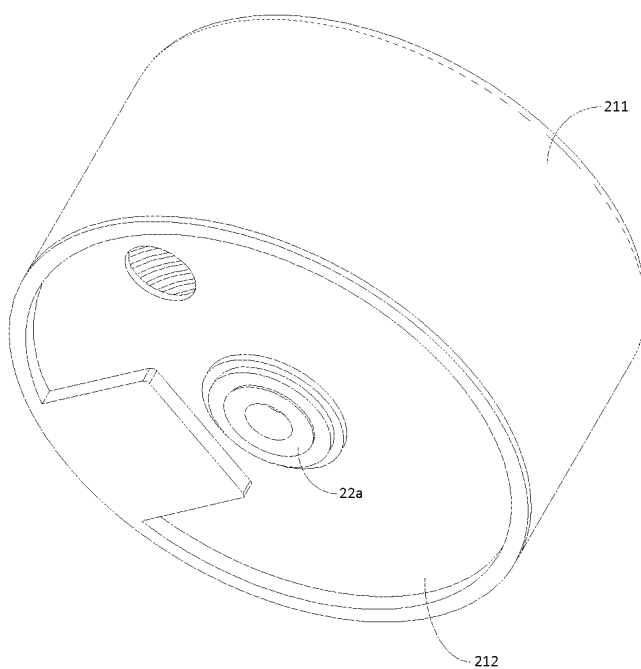
Figure 18:
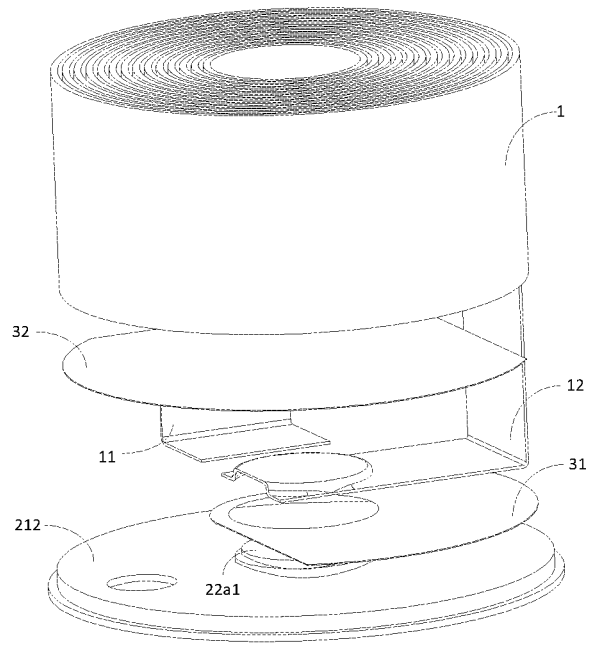
FIG. 18 is an exploded view of a button cell provided in Embodiment II of the present disclosure.

The specific assembly process of the button cell with the housing assembly of the present embodiment is shown in FIGS. 13 to 17. First, adjust the first tab 11 of the cell to a shape and size that can extend into the tab groove 2123 of the second housing 212, and stamp a position where the second tab 12 is connected with the sheet part 22a1 of the conductive nail to form the conductive groove 121 matching the shape of the sheet part 22a1, as shown in FIG. 13. Then, weld the first tab 11 which is extended into the tab groove 2123 of the second housing 212, as shown in FIG. 14. After the welding of the first tab 11 is completed, snap fitted the conductive groove 121 of the second tab 12 on the sheet part 22a1 of the conductive nail to weld the sheet part 22a1 of the conductive nail and the second tab 12 together, as shown in FIG. 14 and FIG. 15. Specifically, the welding gun extends from the fabrication hole 22a4 into the conductive nail 22a, and conducts welding from a side of the sheet part 22a1 located in the fabrication hole 22a4 to weld the sheet part 22a1 of the conductive nail and the second tab 12 together. Finally, as shown in FIG. 16, snap fitted the first housing 211 on the outside of the cell 1 and weld the first housing 211 and the second housing 212 together to complete the assembly of button cell, as shown in FIG. 17. Next, the assembled button cell needs to be injected with electrolyte through an injection port, and then several processes such as chemical conversion treatment and exhaust treatment need to be performed and finally, the injection port is sealed, for example, a metal cover can be welded at the injection port to complete the sealing.

As shown in FIG. 18, in order to prevent a short-circuit inside the button cell with the housing assembly of the present embodiment and an unsafe accident caused thereby, a first insulating sheet 31 may be interposed between the second tab 12 and the second housing 212. In an implementation, the first insulating sheet 31 is an insulating rubber sheet. In other embodiments, the first insulating sheet 31 may also be an insulating sheet of other materials. The first insulating sheet 31 is provided with a clearance area for avoiding the sheet part 22a1 of the conductive nail, so that the second tab 12 and the sheet part 22a1 of the conductive nail can be smoothly connected and conducted. For example, the cross section of the sheet part 22a1 of the conductive nail is circular, and the clearance area of the sheet part 22a1 on the first insulating sheet 31 is a circular hole matching the cross-sectional size of the sheet part, so that the first insulating sheet 31 can be sheathed around the periphery of the sheet part 22a1. In addition, when the injection port 2125 is located on the second housing 212, the first insulating sheet 31 should also be provided with a clearance area for avoiding the injection port 2125, so as to prevent the first insulating sheet 31 from affecting the process of injecting the electrolyte into the button cell. Specifically, the first insulating sheet 31 may have a fan shape or other shapes, as long as it can be interposed between the second tab 12 and the second housing 212 to realize the function of insulation.

It should be noted that a shape of the first insulating sheet 31 may avoid the tab groove 2123 of the second housing 212, and may also cover the tab groove 2123 of the second housing 212, so that the first tab 11 and the second tab 12 are located on two sides of the first insulating sheet 31, improving the insulation ability between the first tab 11 and the second tab 12. By clamping the first insulating sheet 31 between the second tab 12 and the second housing 212, a short-circuit between the second tab 12 and the second housing 212 and an unsafe accident caused thereby can be avoided, thereby improving reliability of the button cell.

Meanwhile, a second insulating sheet 32 may also be clamped between the cell 1 and the second tab 12. In an implementation, the second insulating sheet 32 is an insulating rubber sheet. In other embodiments, the second insulating sheet 32 may also be an insulating sheet of other materials. The second insulating sheet 32 is provided with a clearance area for avoiding the first tab 11 and the second tab 12, and thus it does not hinder the first tab 11 and the second tab 12 connecting and conducting with the housing assembly 2. Specifically, the second insulating sheet 32 may have a circular shape with a cut surface or other shapes, as long as it can be clamped between the cell 1 and the second tab 12 to realize the function of insulation. By clamping the second insulating sheet 32 between the cell 1 and the second tab 12, a short-circuit between the cell 1 and the second tab 12 and an unsafe accident caused thereby can be avoided, thereby improving the reliability of the button cell.

Other technical features are the same as those in Embodiment I, and same or similar technical effects can be achieved, which will not be repeated here one by one. For details, please refer to the description of Embodiment I.

Embodiment III

The present embodiment provides a button cell, including a cell and a housing assembly of button cell.

The housing assembly of button cell in the present embodiment has a same structure as the housing assembly of button cell provided in Embodiment I, and can bring same or similar technical effects, which will not be repeated here one by one. For details, please refer to the description of the above embodiment.

Embodiment IV

The present embodiment provides an electronic product, including a button cell.

The button cell in the present embodiment has a same structure as the button cell provided in Embodiment II, and can bring same or similar technical effects, which will not be repeated here one by one. For details, please refer to the description of the above embodiment.

In the description of the present disclosure, it should be understood that the terms "top", "bottom", "upper", "lower" (if present), etc. indicate the orientation or positional relationship based on the orientation or positional relationship shown in the drawings It is only for the convenience of describing the present disclosure and simplifying the description, but not for indicating or implying that apparatus or elements referred to must have a specific orientation, and be constructed and operated in a specific orientation, therefore, it cannot be understood as limiting the present disclosure.

In the description of the present disclosure, it should be noted that, unless otherwise clearly specified and defined, the terms "installation", "connection", and "connection" should be understood broadly. For example, it can be a fixed connection, a detachable connection, or an integrally connection; it can be a mechanically connection or an electrically connection; it can be a directly connection, or an indirectly connection through an intermediary, or an internally connection between two components. For those of ordinary skill in the art, the specific meaning of the above terms in the present disclosure can be understood through specific situations.

The terms "first" and "second" in the description and claims of the present application and the description of the above drawings are used to distinguish similar objects, and do not have to be used to describe a specific order or sequence. It should be understood that data used in this way can be interchanged under appropriate circumstances, so that the embodiments of the present application described herein, for example, can be implemented in an order other than those illustrated or described herein.

Finally, it should be noted that the foregoing embodiments are merely intended for describing the technical solutions of the present disclosure other than limiting the present disclosure. Although the present disclosure is described in detail with reference to the foregoing embodiments, those of ordinary skill in the art should understand that they may still make modifications to the technical solutions described in the foregoing embodiments or make equivalent substitutions to some or all of technical features thereof. However, these modifications and substitutions do not make the essence of the corresponding technical solutions separate from the scope of the technical solutions of embodiments of the present disclosure.

What is claimed is:

1. A housing assembly of button cell, comprising: a housing and a conductive part, the housing and the conductive part enclosing together to form a holding cavity for holding a cell of the button cell; wherein,
    the cell of the button cell has a first tab and a second tab;
    the housing is provided with a through hole, and the conductive part penetrates through the through hole, and a sealing rubber ring for sealing and insulating the conductive part and an inner wall of the through hole is provided between the conductive part and the inner wall of the through hole;
    the conductive part comprises a columnar part penetrated through the through hole, and an end of the columnar part facing the cell is provided with a sheet part integrally formed with the columnar part, and an end of the columnar part facing away from the cell extends outwardly with a flanging around the columnar part; and an axial direction of the columnar part is provided with a fabrication hole for welding, wherein a welding between the sheet part of the conductive part and the second tab of the cell of the button cell is conducted from a side of the sheet part located in the fabrication hole;
    at least a part of a housing wall of the housing has a thinning area, and thickness of the housing wall in the thinning area is smaller than thickness of other parts of the housing wall; and the thinning area is configured to be ruptured first to release an internal pressure of the housing assembly;
    an insulating sheet is clamped between the cell of the button cell and the second tab, the insulating sheet is provided with a clearance area for avoiding the second tab, and the insulating sheet has a circular shape with a cut surface.

2. The housing assembly of button cell according to claim 1, wherein a part of the sheet part located in the fabrication hole has a welding mark, and the welding mark is insulated from the cell of the button cell through the insulating sheet.

3. The housing assembly of button cell according to claim 2, wherein the housing has two oppositely disposed end surfaces, and a sidewall is located between the two end surfaces; and
    the conductive part is located on the end surfaces.

4. The housing assembly of button cell according to claim 3, wherein at least a part of at least one of the end surfaces protrudes in a direction away from the cell to form a convex surface; and
    the conductive part is located on the convex surface.

5. The housing assembly of button cell according to claim 2, wherein the housing includes a first housing and a second housing, and the first housing and the second housing are integral parts.

6. The housing assembly of button cell according to claim 2, wherein hardness of the conductive part is smaller than hardness of the housing.

7. The housing assembly of button cell according to claim 1, wherein a gasket is provided between the flanging and the sealing rubber ring.

8. The housing assembly of button cell according to claim 7, wherein the housing has two oppositely disposed end surfaces, and a sidewall is located between the two end surfaces; and
    the conductive part is located on the end surfaces.

9. The housing assembly of button cell according to claim 1, wherein
    the number of the conductive part is one, and the conductive part is configured to electrically connect with one of the first tab and the second tab, and the housing is electrically connected with the other one of the first tab and the second tab; or,
    the number of the conductive part is two, and the housing is provided with two through holes, wherein the conductive parts correspond to the through holes one by one, and wherein one of the two conductive parts is configured to electrically connect with the first tab, and the other one of the two conductive parts is configured to electrically connect with the second tab.

10. The housing assembly of button cell according to claim 9, wherein the housing has two oppositely disposed end surfaces, and a sidewall is located between the two end surfaces; and the conductive part is located on the end surfaces.

11. The housing assembly of button cell according to claim 9, wherein the housing includes a first housing and a second housing, and the first housing and the second housing are integral parts.

12. The housing assembly of button cell according to claim 9, wherein hardness of the conductive part is smaller than hardness of the housing.

13. The housing assembly of button cell according to claim 1, wherein the housing has two oppositely disposed end surfaces, and a sidewall is located between the two end surfaces; and the conductive part is located on the end surfaces.

14. The housing assembly of button cell according to claim 13, wherein at least a part of at least one of the end surfaces protrudes in a direction away from the cell to form a convex surface; and the conductive part is located on the convex surface.

15. The housing assembly of button cell according to claim 1, wherein the housing includes a first housing and a second housing, and the first housing and the second housing are integral parts.

16. The housing assembly of button cell according to claim 15, wherein a side of the second housing facing the first housing is provided with a boss matching an opening of the first housing, and the boss is provided with a tab groove for receiving the first tab.

17. The housing assembly of button cell according to claim 1, wherein hardness of the conductive part is smaller than hardness of the housing.

18. The housing assembly of button cell according to claim 1, wherein a position where the second tab is connected with the sheet part is depressed in a direction away from the sheet part to form a conductive groove matching a shape of the sheet part.

19. A button cell, comprising: a cell and a housing assembly of button cell, wherein the housing assembly of button cell comprises: a housing and a conductive part, the housing and the conductive part enclosing together to form a holding cavity for holding a cell of the button cell; wherein, the cell of the button cell has a first tab and a second tab;

the housing is provided with a through hole, and the conductive part penetrates through the through hole, and a sealing rubber ring for sealing and insulating the conductive part and an inner wall of the through hole is provided between the conductive part and the inner wall of the through hole;

the conductive part comprises a columnar part penetrated through the through hole, and an end of the columnar part facing the cell is provided with a sheet part integrally formed with the columnar part, and an end of the columnar part facing away from the cell extends outwardly with a flanging around the columnar part; and an axial direction of the columnar part is provided with a fabrication hole for welding, wherein a welding between the sheet part of the conductive part and the second tab of the cell of the button cell is conducted from a side of the sheet part located in the fabrication hole;

at least a part of a housing wall of the housing has a thinning area, and thickness of the housing wall in the thinning area is smaller than thickness of other parts of the housing wall; and the thinning area is configured to be ruptured first to release an internal pressure of the housing assembly;

an insulating sheet is clamped between the cell of the button cell and the second tab, the insulating sheet is provided with a clearance area for avoiding the second tab, and the insulating sheet has a circular shape with a cut surface.

20. An electronic product, comprising: a button cell, wherein the button cell comprises: a cell and a housing assembly of button cell, wherein the housing assembly of button cell comprises: a housing and a conductive part, the housing and the conductive part enclosing together to form a holding cavity for holding a cell of the button cell; wherein, the cell of the button cell has a first tab and a second tab;

the housing is provided with a through hole, and the conductive part penetrates through the through hole, and a sealing rubber ring for sealing and insulating the conductive part and an inner wall of the through hole is provided between the conductive part and the inner wall of the through hole;

the conductive part comprises a columnar part penetrated through the through hole, and an end of the columnar part facing the cell is provided with a sheet part integrally formed with the columnar part, and an end of the columnar part facing away from the cell extends outwardly with a flanging around the columnar part; and an axial direction of the columnar part is provided with a fabrication hole for welding, wherein a welding between the sheet part of the conductive part and the second tab of the cell of the button cell is conducted from a side of the sheet part located in the fabrication hole;

at least a part of a housing wall of the housing has a thinning area, and thickness of the housing wall in the thinning area is smaller than thickness of other parts of the housing wall; and the thinning area is configured to be ruptured first to release an internal pressure of the housing assembly;

an insulating sheet is clamped between the cell of the button cell and the second tab, the insulating sheet is provided with a clearance area for avoiding the second tab, and the insulating sheet has a circular shape with a cut surface.

* * * * *